United States Patent

Driessen et al.

[11] Patent Number: 5,921,574
[45] Date of Patent: Jul. 13, 1999

[54] PRAM

[75] Inventors: Franciscus Johannes Cornelis Driessen, Tilburg; Bart Willem Jozef Bost, Maastricht, both of Netherlands

[73] Assignee: Driessen Beheer B.V., Netherlands

[21] Appl. No.: 08/721,995
[22] PCT Filed: Apr. 24, 1995
[86] PCT No.: PCT/NL95/00151
§ 371 Date: Feb. 20, 1997
§ 102(e) Date: Feb. 20, 1997
[87] PCT Pub. No.: WO95/29086
PCT Pub. Date: Nov. 2, 1995

Related U.S. Application Data

[30] Foreign Application Priority Data

Apr. 22, 1994 [NL] Netherlands ............................ 9400645

[51] Int. Cl.⁶ ...................................................... B62B 3/02
[52] U.S. Cl. ................. 280/655.1; 280/658; 280/47.371; 280/47.38
[58] Field of Search ..................................... 280/638, 639, 280/651, 642, 657, 655.1, 658, 47.34, 47.35, 47.38, 47.41, 47.371

[56] References Cited

U.S. PATENT DOCUMENTS 4,836,573  6/1989  Gebhard ................................ 280/658
4,892,327  1/1990  Cabegnero ............................. 280/658

FOREIGN PATENT DOCUMENTS 2204282  11/1988  United Kingdom.
86/03464  6/1986  WIPO.

*Primary Examiner*—Richard M. Camby
*Attorney, Agent, or Firm*—Banner & Witcoff, Ltd.

[57] ABSTRACT

The invention relates to a perambulator (1), comprising: a folding frame provided with wheels (9); and a carrying element (5) connectable to the frame for carrying the child to be transported, wherein the frame comprises a substantially horizontally extending undercarriage (2) and a pushing element (3), wherein the pushing element (3) extends as a rigid unit above and as far as the undercarriage (2) and is hindegly connected to the undercarriage and wherein the carrying element is connectable to the pushing element. As a result of these steps, because the cross-shaped part of the frame of the prior art perambulators is omitted, a perambulator is obtained with a much smaller number of components. A perambulator is furthermore obtained of which the appearance is largely determined by the structure of the frame, which is generally seen in a positive light. According to a preferred embodiment the pushing element (3) of the perambulator is provided with two rods (17), each connected hingedly to the undercarriage (2), and with a substantially U-shaped push rod (20) connected thereto for sliding in longitudinal direction, wherein the push rod is lockable with the rods (17) in at least one position.

15 Claims, 4 Drawing Sheets

PRAM

The invention relates to a pram, comprising a folding frame provided with wheels and a carrying element connectable to the frame for carrying the child to be transported, wherein the frame comprises a substantially horizontally extending undercarriage and a pushing element.

Such child carriages are generally known. They are provided with a frame which, in addition to the undercarriage, has a part with a cross-shaped structure to which the pushing element is connected, and on which cross-shaped structure the carrying element for the child can be placed. To enable storage of the perambulator in the smallest possible space or to enable it to be taken along in for instance the boot of a car, such a perambulator is collapsible. This generally takes place by removing the carrying element and by folding up the part of the frame with the cross-shaped structure by means of tilting the pushing element. The frame can hereby be folded to a height which is usually slightly smaller than the height of the wheels. Furthermore, the wheels are in many cases also detachable from the frame.

Such a perambulator of the prior art comprises a large number of parts, whereby production is expensive and the frame is relatively heavy.

The object of the present invention is to provide a perambulator which is lighter and whereof the number of parts is smaller.

The invention moreover has for its object to provide a perambulator which, because of its simple structure, has a more attractive appearance than the perambulators of the prior art.

This object is achieved by a perambulator wherein the pushing element extends as a rigid unit above and as far as the undercarriage and is hingedly connected to the undercarriage and wherein the carrying element is connectable to the pushing element.

As a result of these steps, because the cross-shaped part of the frame of the prior art perambulators is omitted, a perambulator is obtained with a much smaller number of components. A perambulator is furthermore obtained of which the appearance is largely determined by the structure of the frame, which is generally seen in a positive light.

Because the pushing element is connected hingedly to the undercarriage the perambulator according to the invention is also foldable.

It is further noted that while perambulators are known in the form of so-called "buggies", which likewise have two rods extending from the front of the carriage obliquely rearward to the handles, a very large number of other rods is moreover still present in these perambulators of the prior art, so that these perambulators have many components and, if they are to be constructed sufficiently robustly, they are comparatively heavy or must be manufactured from costly materials.

According to a preferred embodiment the pushing element of the perambulator is provided with two rods, each connected hingedly to the undercarriage, and with a substantially U-shaped push rod connected thereto for sliding in longitudinal direction, wherein the push rod is lockable with the rods in at least one position.

The present invention will be elucidated hereinbelow with reference to the annexed drawings, in which.

Figure 1:
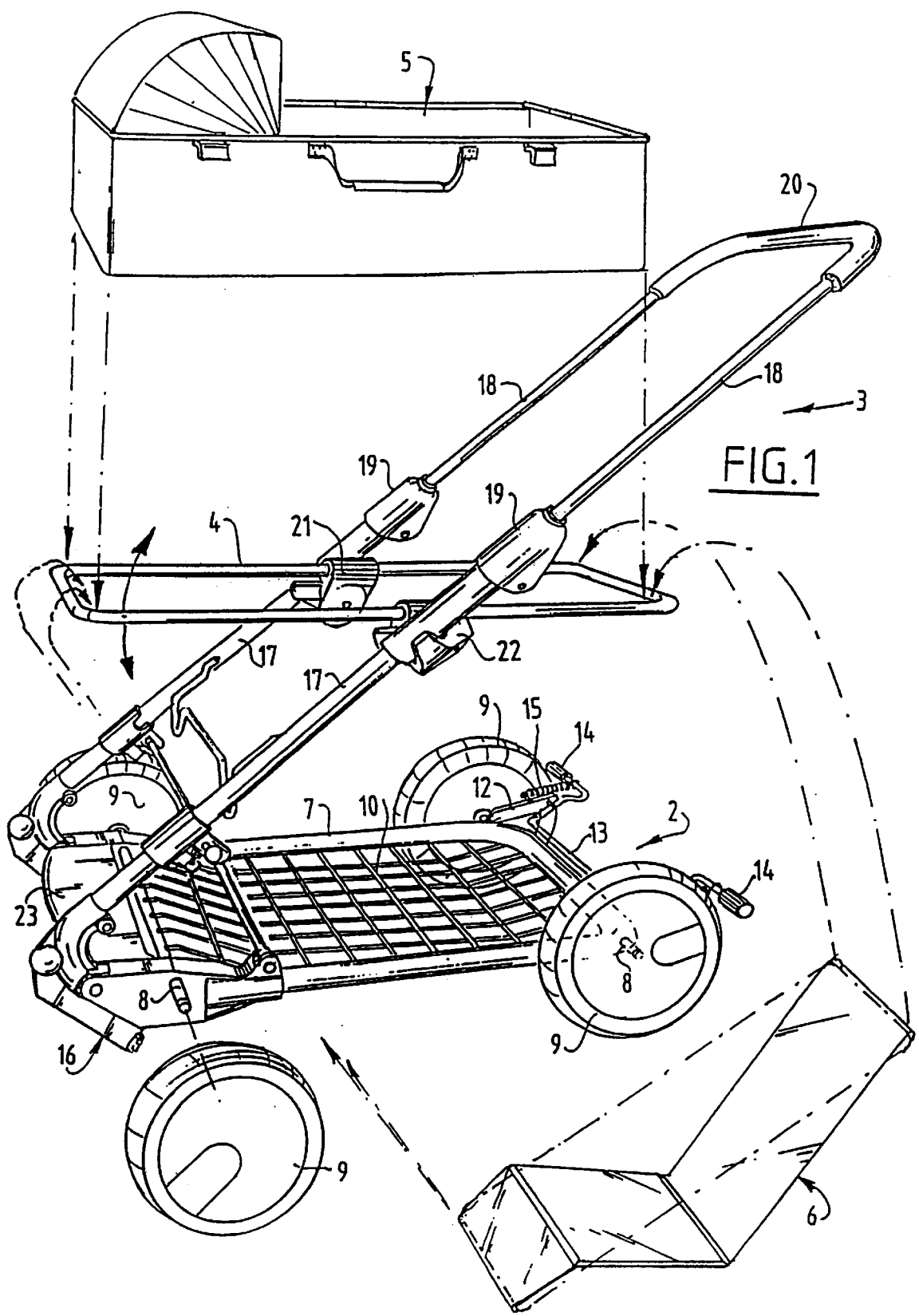
FIG. 1 shows a perspective view of a perambulator according to the present invention.

Shown in FIG. 1 is a perambulator 1 formed by an undercarriage 2 and a pushing element 3 hingedly connected to the undercarriage 2. Further fixed to pushing element 3 is a sub-frame 4 which is adapted to fix a carrycot 5 or a child seat 6.

The undercarriage 2 is formed by a U-shaped curved tube 7 onto which are fixed shaft stumps 8, on each of which wheels 9 can be rotatably mounted. A wire mesh basket 10 is arranged inside the U-shaped curved tube 7.

Fixed on the frame close to both rear wheels is a braking mechanism 11 formed by brackets 12 which are fixed to the U-shaped tube 7 and to which a lever 13 is pivotally connected which is provided on both ends with brake sleeves 14 which can be placed with the foot against the tread of the relevant wheels 9. The braking mechanism further comprises at least one spring 15 for urging the lever 13 to its active or inactive position.

The pushing element 3 is connected to the undercarriage 2 by means of two hinge constructions 16. The latter will be further elucidated with reference to FIG. 3.

The pushing element 3 is formed by two tubes 17 which are each connected to one of the hinge constructions 16. On their other end a U-shaped curved pushing tube 18 is placed into each of the tubes 17. The U-shaped pushing tube 18 is thus slidable in longitudinal direction inside both tubes 17, wherein tube 18 is fixable in each of the tubes 17 by means of fixation constructions 19 which will be elucidated with reference to FIG. 4.

A sheath 20 manufactured from plastic is further arranged on the pushing side of the U-shaped curved pushing tube 18.

Finally, the perambulator 2 comprises fixation constructions 21, 22 respectively for fastening the sub-frame 4 to the tubes 17 and for fixing the sub-frame. These constructions will be elucidated with reference to FIG. 4. Both hinge constructions 16 are connected by a connecting element 23 which also functions as foot rest.

Figure 2:
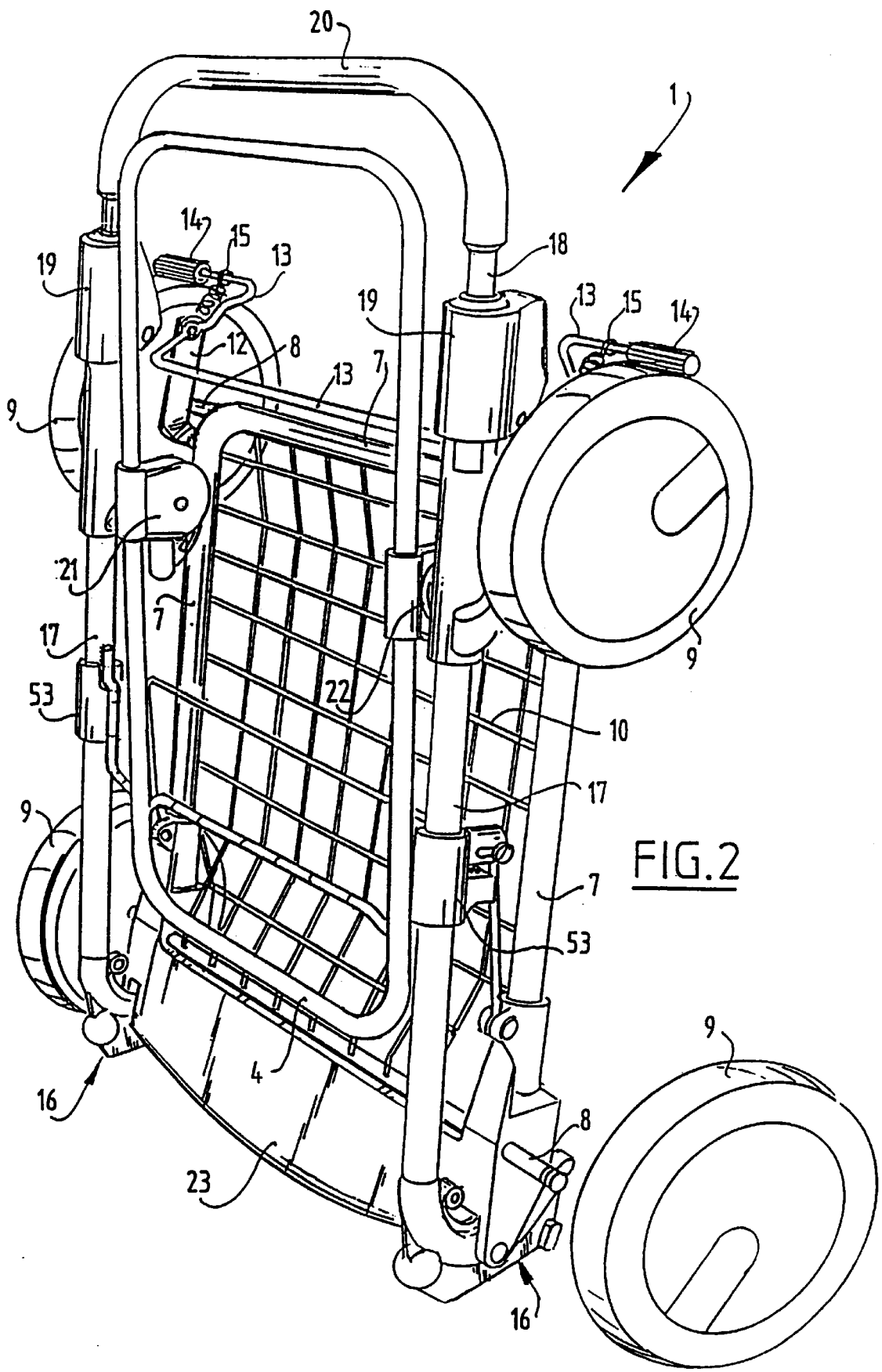
FIG. 2 shows a perspective view of the perambulator of FIG. 1 in folded situation.

FIG. 2 shows how the perambulator is folded up, wherein the pushing element is tilted almost parallel to undercarriage 2, and wherein the U-shaped pushing tube 18 is pushed into both tubes 17. In this situation the perambulator 1 takes up the smallest volume.

Figure 3:
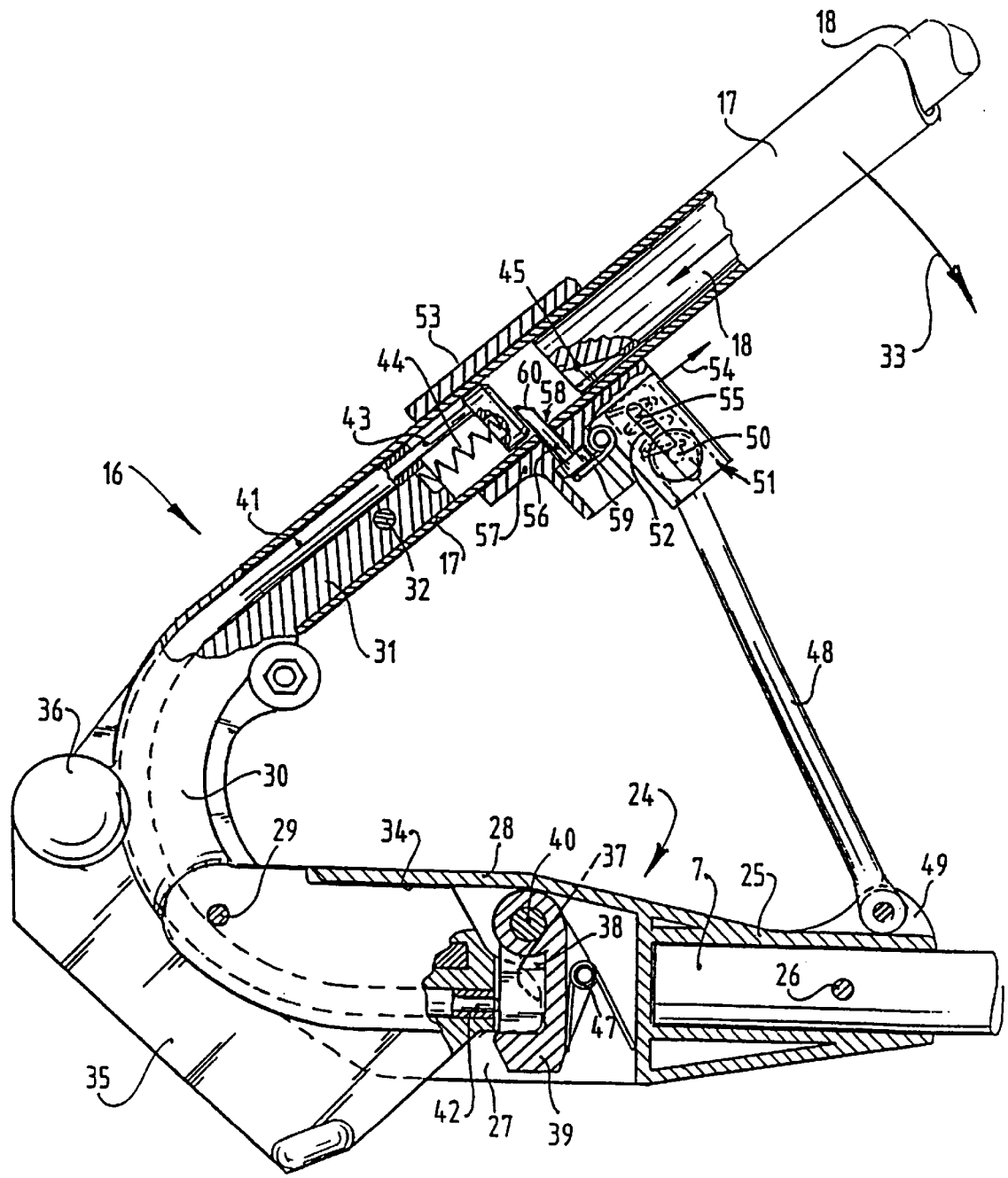
FIG. 3 is a sectional view of one of the two hinge constructions forming part of the perambulator according to the invention.

The hinge construction 16 is shown in more detail in FIG. 3. Hinge construction 16 comprises a component 24 which is manufactured from plastic and provided with a sleeve 25 into which is inserted an end of the U-shaped tube 7 which is fixed therein by means of a pin 26. The component 24 comprises on its other side two cheeks 27 which are connected on their upper part by a cover part 28, and wherein on the end of both cheeks 27 is arranged a hinge pin 29 in which another part 30 of the hinge construction is pivotally mounted.

The second part 30 runs out at its free end into a round rod 31 around which the relevant rod 17 is arranged, wherein rod 17 is fixed onto rod 31 by means of a fixation pin 32. Using the above construction the rod 17 can thus move downward as indicated by arrow 33. The second part 30 extends further in line with rod 17 and is provided on its upper part with a stop surface 34 for limiting the stroke of the part 30 up to the cover plate 28. On its outside the part 30 is provided with a strengthening side plate 35. For decorative purposes a sphere 36 is further arranged on the stop on plate 28.

In order to lock the hinge construction in its extreme position the part 30 is provided with a locking tongue 37 which in its locked position falls into a space 38 inside a hook 39 arranged between both cheeks 27. Hook 39 is arranged pivotally between both cheeks 27 by means of a shaft 40. A spring 41 presses hook 39 to the position in which the tongue 37, and therewith the second part 30 and thus the whole pushing element, is locked in its uppermost position. With the construction discussed up to this point it is thus possible, by moving the pushing element sufficiently far upward in a direction opposite to that of arrow 33, to place the tongue 37 in engagement with the cavity 38 arranged in hook 39.

Use is made for release purposes of a release mechanism formed by a flexible pushing member 41 in the form of a bowden cable arranged in a recess arranged for this purpose inside the rod 31 and the relevant portion of the second part 30. The bowden cable is provided on one side with a pressing piece 42 and on the other side with an excitation element 43. The latter, and therewith the bowden cable 41 and the pressing element 42, are normally urged by means of a spring 44 to an extreme position in which the locking is maintained.

In order to release the lock use is made of the part is of the U-shaped pushing tube 18 extending inside the tube 17. Pushing tube 18 is provided on both its ends with a solid portion 45 provided with a chamfered edge 46. When pushing tube 18 is pushed in sufficiently, the solid portion 45 presses against the excitation element 43, whereby the bowden cable 41 is pressed in and the pressure element 42 pushes away the hook 39 counter to the spring pressure of spring 47, whereby tongue 37 is released from the cavity 38. The pushing element can subsequently be moved downward as according to arrow 33.

For further support of the pushing element each hinge construction 16 is provided with a lever 48 which is rotatably connected to a cheek 49 fixed to the sleeve 25. The other end of lever 48 is provided with a transversely extending pin 50 which extends in a pair of slots 52 arranged in a sleeve 51. The sleeve 51 is connected to a sleeve-like carriage 53 which is movable over tube 17. It is thus possible to move the pushing element downward as according to arrow 33, wherein the sleeve-like carriage 53, and therewith the sleeve 51, are movable in the direction of arrow 54. A certain degree of spring action is obtained due to the presence of a spring 55 inside sleeve 51 and due to the fact that the transverse rod 50 can move along the slots 52.

In order to lock carriage 53 is the relevant position on rod 17, use is made of a pin 56 which is guided through a guide sleeve 57 likewise forming part of the carriage 53. In the locked position the pin 57 extends through an aperture 58 arranged in tube 17. The pin 57 is urged through the hole 58 by means of a spring 59.

In order to release pin 56 use is made of the chamfering 46 of the solid portion 45. When pushing rod 18 is moved downward the slanting side 46 presses against a chamfered side 60 of pin 57 so that the latter is pressed out of the hole 58 and the carriage 53 can move along rod 17 and the pushing element can be folded downward in the direction of arrow 33.

Thus is obtained the double safety usual in perambulators; both the hook 39 and the pin 56 must be released.

Figure 4:
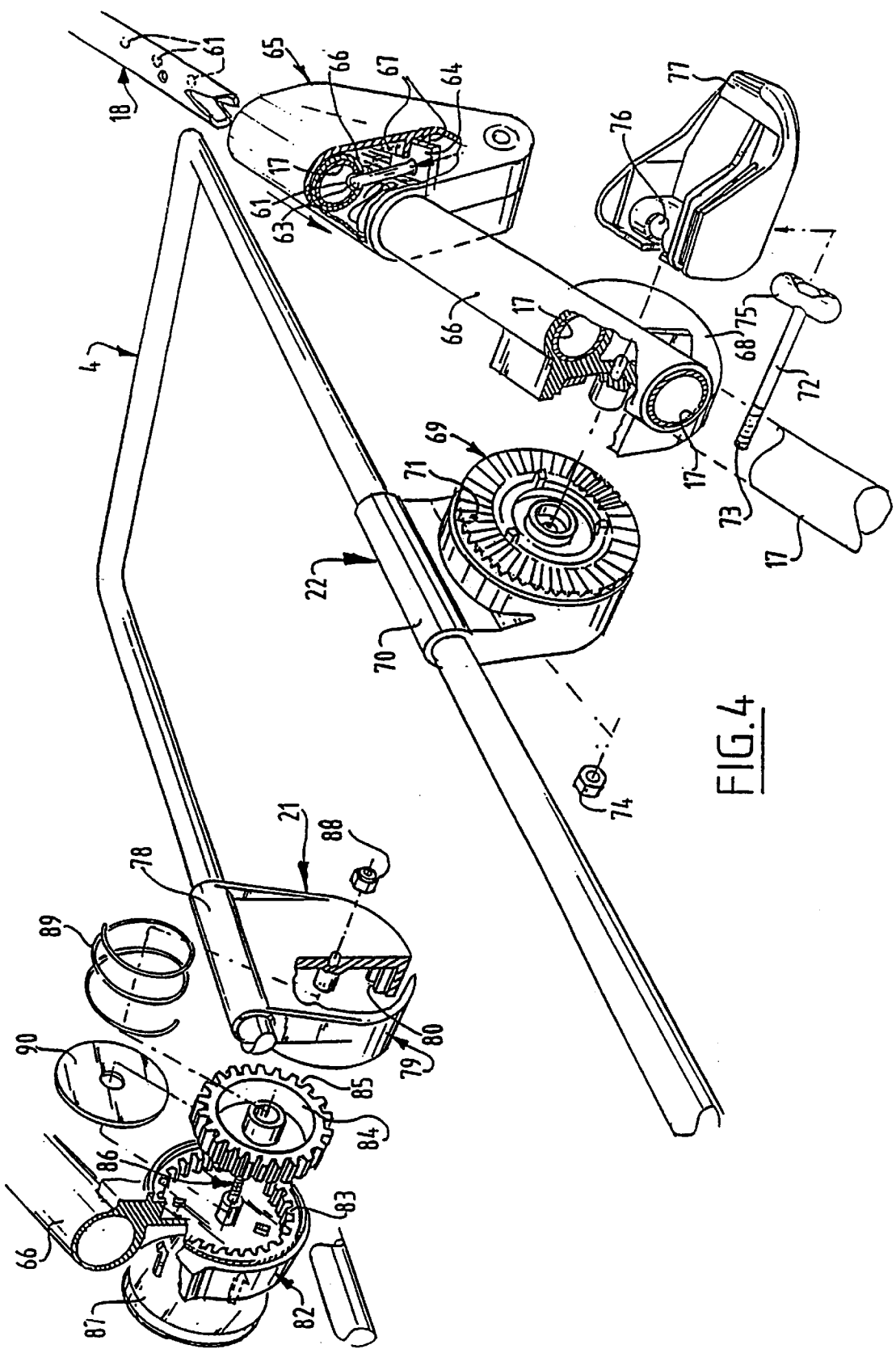
FIG. 4 is an exploded view of a detail construction of the perambulator according to the present invention.

Shown in FIG. 4 is the fixation construction 19 for fixing the pushing rod 18 in the rod 17. In order to enable fixation use is made of holes 61 arranged in pushing rod 18. At the position of the fixation mechanism 19 an aperture 62 is arranged in rod 17, while each time a hole 61 is arranged coinciding with aperture 62 a pin 63 can be inserted through both openings. Fixation can thus take place.

By moving the pin 63 in the direction perpendicular to the rods 17,18 fixation can be engaged or disengaged.

For driving of the pin 63 the head of pin 63 is provided with a guide plate 64. In order to drive guide plate 64 use is made of a sleeve 65 arranged slidably on tube 17. To facilitate sliding of sleeve 65 a plastic sheath 66 is arranged round tube 17 at the position of the slide path, while the inside of sleeve 65 is provided with two pairs of guides 67 which extend obliquely so that the longitudinal movement of sleeve 65 results in a movement of both guides 67 perpendicularly thereof, and therewith also of the guide plate 64 enclosed between guides 67 and of the pin 63. By thus sliding sleeve 19 longitudinally the fixation defined by pin 63 can be engaged or disengaged.

So as to give warning that sleeve 65 is placed in a position such that there is no locking and the rod 18 is thus movable relative to rod 17, a warning in the form of a brightly coloured section can be arranged at the relevant position on the sheath 66, which position is not shown in FIG. 4 because it is covered by sleeve 65.

In order to lock sub-frame 4 relative to rod 17 use is made on one side of a mechanism 22 formed by a plate 68 which is fixedly connected to the sheath 66 and which is provided with a toothing on the side not shown in the drawing. A similar plate 69 is fixed to sub-frame 4 by means of a bracket 70, wherein plate 69 is provided with a toothing 71 on its outer side.

For mutual connection of both plates use is made of a screw 72 provided on one end with screw thread 73 onto which a nut 74 can be screwed and which is provided on its other side with a hammer head 75. Screw 72 extends through openings arranged in the plates 68,69. The hammer head 75 is received in a cavity 76 of a lever 77. The locking can be disengaged by swinging away the lever.

Arranged on the other side of sub-frame 4 is a fixation device 21 which is formed by a bracket 78 which is fastened to the sub-frame 4 and on which is arranged a ring 79 provided with internal toothing 80. On the sheath 66 of the other rod 17 arranged on the other side a bracket 81 is likewise arranged to which is fastened a ring 82 provided with internal toothing 83. A tooth wheel 84 connecting onto at least the toothing 83 is arranged between the two rings 79,82, wherein the toothing 85 of tooth wheel 84 is always in engagement with toothing 83.

Extending through openings arranged in brackets 78,81 and tooth wheel 84 is a bolt 86 which is rigidly connected on one side with a push button 87 and fixation of which bolt takes place on the other side by means of a nut 88. A compression spring 89 and a plate 90 are further accommodated between tooth wheel 84 and bracket 78. The toothing 85 of tooth wheel 84 normally engages with both toothing 80 and toothing 83.

By pressing the button 87 the tooth wheel 84 is pressed inward counter to the compression of spring 89, whereby the engagement with toothing 83 is released. Both rings 79,82 can thus be rotated mutually and the bracket 4 can be rotated relative to the rods 17.

This is of importance in the situation where the frame has to be folded up and in the situation where the perambulator is in use and the position of sub-frame 4 depends on the manner of carrying the child; when for instance a carrycot is used the sub-frame 4 will have to be placed horizontally and when a child's seat is used the sub-frame 4 will have to be placed parallel to the rods 17.

The application of different types of locking mechanisms is associated with safety and the fact that only one mechanism can be operated at a time, since the second hand is needed to turn the sub-frame.

It will be apparent that other types of constructions can be applied instead of the constructions shown for the diverse components of this perambulator.

We claim:

1. Perambulator, comprising:

a folding frame provided with wheels; and a carrying element connectable to the frame for carrying a child to be transported;

wherein the frame comprises a substantially horizontally extending undercarriage and a pushing element extending as a rigid unit above and as far as the undercarriage and being hingedly connected to the undercarriage, the pushing element comprising two rods, each said rod being hingedly connected to the undercarriage, and a substantially U-shaped push rod connected to each of said two rods for sliding in a longitudinal direction, the push rod being lockable with the two rods in at least one position, and the frame further comprising a locking mechanism for locking the pushing element in at least one angular position relative to the undercarriage, and a release mechanism connected to the U-shaped push rod for cooperating with the U-shaped push rod to release the locking mechanism.

2. Perambulator as claimed in claim 1 characterized in that the carrying element includes a sub-frame and a child carrier, the sub-frame being hingedly connected to the pushing element, the sub-frame being adapted to receive the child carrier and the sub-frame being capable of being locked in at least one position with the pushing element.

3. Perambulator as claimed in claim 1, characterized in that the push rod is telescopically slidable in both said rods.

4. Perambulator as claimed in claim 1, characterized by a support element for supporting the pushing element in a locked position.

5. Perambulator as claimed in claim 4, characterized in that the support element is positioned on a side of the pushing element and connected to the pushing element by a carriage said carriage being slidable along the pushing element and a second locking mechanism for locking the carriage in at least one position with the pushing element.

6. Perambulator as claimed in claim 5, characterized by a second release mechanism connected to the U-shaped push rod for releasing the second locking mechanism.

7. Perambulator as claimed in claim 4, characterized in that the support element is adapted to perform a spring function.

8. Perambulator as claimed in claim 3, characterized by a support element for supporting the pushing element in a locked position.

9. Perambulator as claimed in claim 2, characterized by two separate sub-frame locking mechanisms for connecting the sub-frame to the pushing element.

10. Perambulator as claimed in claim 9, characterized in that the first sub-frame locking mechanism includes a button for releasing the first sub-frame locking mechanism when pressed and that the second sub-frame locking mechanism includes a lever for placing the second subframe locking mechanism in a released position or in a locked position.

11. Perambulator as claimed in claim 5, characterized in that the support element is adapted to perform a spring function.

12. Perambulator as claimed in claim 6, characterized in that the support element is adapted to perform a spring function.

13. Perambulator as claimed in claim 7, characterized in that the carrying element includes a sub-frame and a child carrier, the sub-frame being hingedly connected to the pushing element, the sub-frame being adapted to receive the child carrier and the sub-frame being capable of being locked in at least one position with the pushing element.

14. Perambulator as claimed in claim 5, characterized in that the carrying element includes a sub-frame and a child carrier, the sub-frame being hingedly connected to the pushing element, the sub-frame being adapted to receive the child carrier and the sub-frame being capable of being locked in at least one position with the pushing element.

15. Perambulator as claimed in claim 6, characterized in that the carrying element includes a sub-frame and a child carrier, the sub-frame being hingedly connected to the pushing element, the sub-frame being adapted to receive the child carrier and the sub-frame being capable of being locked in at least one position with the pushing element.

* * * * *